US011616702B2

United States Patent
Cai et al.

(10) Patent No.: US 11,616,702 B2
(45) Date of Patent: Mar. 28, 2023

(54) METHOD AND APPARATUS FOR DIFFERENTIALLY OPTIMIZING QUALITY OF SERVICE QOS

(71) Applicant: Guangdong Polytechnic Normal University, Guangzhou (CN)

(72) Inventors: Jun Cai, Guangzhou (CN); Hongtian Fu, Guangzhou (CN); Yan Liu, Guangzhou (CN); Jianzhen Luo, Guangzhou (CN); Liping Liao, Guangzhou (CN)

(73) Assignee: GUANGDONG POLYTECHNIC NORMAL UNIVERSITY, Guangzhou (CN)

( * ) Notice: Subject to any disclaimer, the term of this patent is extended or adjusted under 35 U.S.C. 154(b) by 0 days.

(21) Appl. No.: 17/729,318

(22) Filed: Apr. 26, 2022

(65) Prior Publication Data
US 2022/0400062 A1   Dec. 15, 2022

(30) Foreign Application Priority Data

Jun. 15, 2021 (CN) .......................... 202110663039.1

(51) Int. Cl.
*H04L 41/50* (2022.01)
*G06F 9/48* (2006.01)
*H04L 67/10* (2022.01)
*H04L 67/1004* (2022.01)

(52) U.S. Cl.
CPC .......... *H04L 41/50* (2013.01); *G06F 9/4843* (2013.01); *H04L 67/10* (2013.01); *H04L 67/1004* (2013.01)

(58) Field of Classification Search
CPC ..... H04L 41/50; H04L 67/10; H04L 67/1004; G06F 9/4843
See application file for complete search history.

(56) References Cited

U.S. PATENT DOCUMENTS

| | | | |
|---|---|---|---|
| 10,554,738 B1 * | 2/2020 | Ren | ..................... G06F 11/3414 |
| 2021/0067417 A1 * | 3/2021 | DeLay | .................. G06N 3/088 |
| 2021/0185134 A1 * | 6/2021 | Strijkers | ............... H04W 8/082 |

* cited by examiner

*Primary Examiner* — Jason D Recek
(74) *Attorney, Agent, or Firm* — Getech Law LLC; Jun Ye

(57) ABSTRACT

A method and apparatus for differentially optimizing a quality of service (QoS) includes: establishing a system model of a multi-task unloading framework; acquiring a mode for users executing a computation task, executing, according to the mode for users executing the computation task, the system model of the multi-task unloading framework; and optimizing a quality of service (QoS) on the basis of a multi-objective optimization method for a multi-agent deep reinforcement learning. According to the present invention, an unloading policy is calculated on the basis of a multi-user differentiated QoS of a multi-agent deep reinforcement learning, and with the differentiated QoS requirements among different users in a system being considered, a global unloading decision is performed according to a task performance requirement and a network resource state, and differentiated performance optimization is performed on different user requirements, thereby effectively improving a system resource utilization rate and a user service quality.

10 Claims, 2 Drawing Sheets

METHOD AND APPARATUS FOR DIFFERENTIALLY OPTIMIZING QUALITY OF SERVICE QOS

TECHNICAL FIELD

The present invention relates to the technical field of communications, and specifically relates to a method and apparatus for differentially optimizing a quality of service (QoS).

BACKGROUND

In recent years, the widespread use of computation-intensive applications represented by virtual reality and augmented reality, poses great challenges to terminals with limited computation power and battery capacity. Most of the existing researches on computation unloading optimize the overall delay or overall energy of a system, ignoring the different QoS (Quality of Service) requirements among different users. In the research of weighing delay and energy, most of them combine delay with energy by means of setting a weight. An application scenario is limited, and when task requirements change, it is necessary to reset a weight value and retrain a decision network, which is complicated and inefficient.

SUMMARY

The main objective of the present invention is to propose a method for differentially optimizing a quality of service (QoS), aiming at solving the existing technical problems that when the computation task requirements of a user change, it is necessary to reset a weight value and retrain a decision network, which is complicated and inefficient.

To achieve the above-mentioned objective, the present invention proposes a method for differentially optimizing a quality of service (QoS), the method comprises:

establishing a system model of a multi-task unloading framework;

acquiring a mode for users executing a computation task, executing, according to the mode for users executing the computation task, the system model of the multi-task unloading framework; and optimizing a quality of service (QoS) on the basis of a multi-objective optimization method for a multi-agent deep reinforcement learning.

Preferably, a system model of the multi-task unloading framework comprises:

an MEC base station, a cloud server and a plurality of mobile users, wherein the plurality of mobile users are within a signal coverage range of the MEC base station.

Preferably, the MEC base station is provided with an edge computation server and a decision agent.

Preferably, the mode of the users executing computation task comprises:

a local execution mode, that is, the users use a local resource to process the computation task;

a D2D execution mode, that is, the users unload task to a nearby terminal with abundant resource for execution by means of a D2D link;

a D2E execution mode, that is, the users unload the task to an edge server by means of a cellular link for execution; and a D2C execution mode, that is, the users transmit the task to the MEC base station by means of the cellular link, and then the MEC base station further sends the task to the cloud server for execution.

Preferably, a system model of the multi-task unloading framework comprises:

a user model, a communication model and a computation model.

Preferably, the executing, according to the mode for users executing the computation task, the system model of the multi-task unloading framework comprises:

when a user i generates a computation task, selecting an optimal node to perform the computation task according to a requirement for a QoS of the users and the state of a network resource;

allowing a binary vector $a_i = \{a_{i,0}, \ldots, a_{i,N}{}^d, a_{i,N+1}{}^d\}$ to represent the decision of the computation task unloading, and allowing $a_{i,j} \in \{0,1\}$ to represent whether a node j executes the computation task generated by the user i;

when $a_{i,i} = 1$, representing that a task i is executed locally, $a_{i,0} = 1$ representing that the task i is unloaded to the MEC server for execution, and $a_{i,N+1} = 1$ representing that the task i is unloaded to the cloud center for execution;

because the task is inseparable, there being a $\Sigma_{j=0}^{N+1} a_{i,j} = 1$, a computation task completion delay generated by the user i is:

$$D_i = \begin{bmatrix} a_{i,i}, \sum_{j \in N, j \neq i}^{N} a_{i,j}, a_{i,0}, a_{i,N+1} \end{bmatrix} \times \\ \begin{bmatrix} D_i^{loc}, D_i^{d2d}, D_i^{d2e}, D_i^{d2c} \end{bmatrix}^T ;$$

and the energy consumption is:

$$E_i = \begin{bmatrix} a_{i,i}, \sum_{j \in N, j \neq i}^{N} a_{i,j}, a_{i,0}, a_{i,N+1} \end{bmatrix} \times \\ \begin{bmatrix} E_i^{loc}, E_i^{d2d}, E_i^{d2e}, E_i^{d2c} \end{bmatrix}^T .$$

Preferably, the optimizing a quality of service (QoS) on the basis of a multi-objective optimization method for a multi-agent deep reinforcement learning comprises:

setting a state space, an action space and a reward function;

performing QoS optimization, according to the state space, the action space and the reward function on the basis of multi-user differentiation for an MADDPG.

Preferably, the setting the state space comprises:

defining a delay agent and an energy agent, wherein the delay agent makes the decision of unloading for delay-sensitive tasks, and the energy agent makes the decision of unloading for energy-sensitive tasks; and using $s_t^d \in S^d$, $s_t^e \in S^e$ to represent the states of the delay agent and the energy agent in a time slot t, defined as follows $s_t^d = \{d(t), u(t), v(t), c(t), \tau(t)\}.$ $s_t^e = \{d(t), u(t), v(t), c(t), e(t)\},$ wherein $d(t) = \{d_1(t), \ldots, d_N(t)\}$, wherein $d_n(t) = \{d_{nj}(t): j \in 0 \cup \mathcal{N}\}$ represents the distance between the user n and the server and other users in the time slot t, wherein $d_{n,0}$ represents the distance between the user n and the edge computation server; $u(t) = \{u_0(t), \ldots, u_N(t), u_{N+1(t)}\}$ represents an available computation resource of the users and the server in the time slot t, $u_0(t)$ represents an available computation resource of the edge server, $u_{N+1}(t)$ represents an available computation resource of the cloud server, and $v(t) = \{v_1(t), \ldots, v_N(t)\}$ represents the size of a data volume of the computation task generated by the users in the time slot t, wherein $v_n(t) = 0$ represents the user n does not generate the computation task in the time slot t, c(t)={$c_1(t), \ldots, c_N(t)$} represents the computation density size of the computation task generated by the user in the time slot t, that is, the number of CPU cycles required for computing data per bit, $\tau(t)=\{\tau_1(t), \ldots, \tau_N(t)\}$ represents the constraint delay of the computation task generated by the users in the time slot t, and e(t)={$e_1(t), \ldots, e_N(t)$} represents the user energy constraint of the computation task generated by the users in the time slot t.

Preferably, the setting the action space comprises:

selecting, by the delay agent and the energy agent, an optimal task unloading node for the users according to the state $s_t^d$, $s_t^e$ of the time slot t, and using $a_t^d \in \mathcal{A}^d$, $a_t^e \in \mathcal{A}^e$ represent the decision of unloading for the delay agent and the energy agent in time slot t, represented as follows:

$a_t^d = \{a_1(t), \ldots, a_G(t)\}, G \in \mathcal{G}$.

$a_t^e = \{a_1(t), \ldots, a_H(t)\}, H \in \mathcal{H}$, wherein $a_n(t)=[a_{n,0}(t), \ldots, a_{n,N}, a_{n,N+1}(t)]$ is a binary vector, which represents the unloading position of the computation task generated by the user n, and $\sum_{j=0}^{N+1} a_{n,j}(t)=1$, that is, the task is inseparable, and is unloaded to a selected node for execution.

Preferably, the setting the reward function comprises:

defining an instant time delay reward $r_t^d$ and an energy reward $r_t^e$, represented as follows:

$$r_t^d = \begin{cases} \sum_{g=1}^{G} (\tau_g(t) - D_g(t)), \text{ s.t. } C_1, C_3, C_4 \\ -\eta, \text{ otherwise} \end{cases};$$

$$r_t^e = \begin{cases} \sum_{h=1}^{H} (e_h(t) - E_h(t)), \text{ s.t. } C_2, C_3, C_4 \\ -\eta, \text{ otherwise} \end{cases};$$

wherein if the decision of unloading does not meet a constraint condition, the delay agent or the energy agent receives a penalty value, $-\eta$ represents that the action is unacceptable, wherein $\eta$ is a design parameter, and $\eta > 0$.

In addition, the present invention further proposes an apparatus for optimizing a quality of service (QoS), the apparatus comprises:

a system model establishment module, used for establishing a system model of a multi-task unloading framework;

a system execution module, used for acquiring a mode for users executing a computation task, executing, according to the mode for users executing the computation task, the system model of the multi-task unloading framework; and a quality of service (QoS) optimization module, used for optimizing a quality of service (QoS) on the basis of a multi-objective optimization method for a multi-agent deep reinforcement learning.

According to the present invention, a method and apparatus for differentially optimizing a quality of service (QoS), an unloading policy is calculated on the basis of a multi-user differentiated QoS of a multi-agent deep reinforcement learning, and with the differentiated QoS requirements among different users in a system being considered, a global unloading decision is performed according to a task performance requirement and a network resource state, and differentiated performance optimization is performed on different user requirements, thereby effectively improving a system resource utilization rate and a user service quality.

BRIEF DESCRIPTION OF DRAWINGS

In order to more clearly explain the embodiments of the present invention or the technical solutions in the prior art, the following will briefly introduce the drawings that need to be used in the description of the embodiments or the prior art. Obviously, the drawings in the following description are only some embodiments of the present invention, and a person of ordinary skill in the art, other drawings may be obtained according to the structures shown in these drawings without involving any inventive effort.

DESCRIPTION OF REFERENCE NUMERALS

Figure 1:
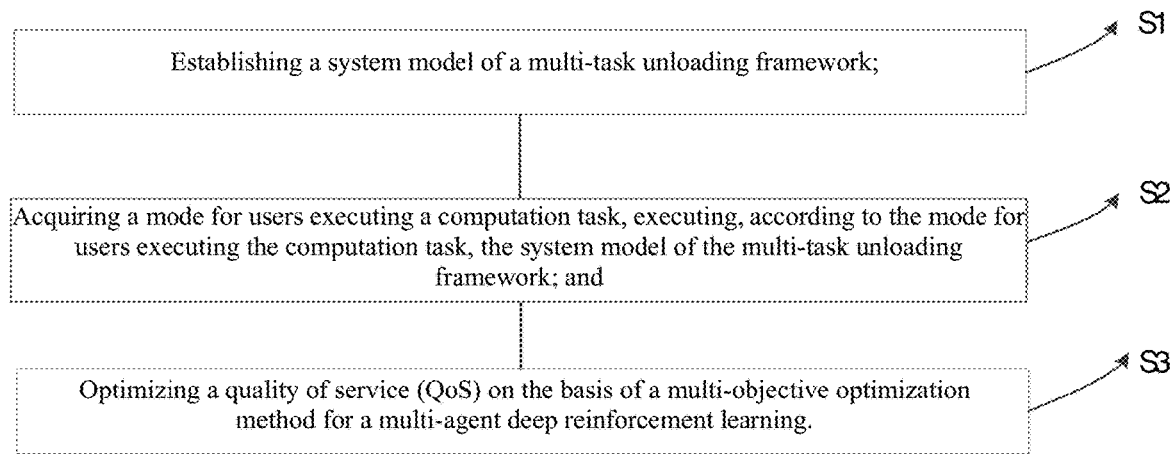
FIG. 1 is a method flow diagram of an embodiment of a method for differentially optimizing a quality of service (QoS) according to the present invention.

| Symbol | Description |
| --- | --- |
| $\mathcal{N}$ | User set |
| $\mathcal{G}$ | Delay sensitive task set |
| $\mathcal{H}$ | Energy sensitive task set |
| $\mathcal{T}$ | System time slot set |
| $\psi_n$ | Task priority of a user n |
| $v_n$ | The input data amount of a task $\psi_n$ |
| $c_n$ | Cpu cycles required to process each bit task |
| $\tau_n$ | Maximum constraint processing delay of the task $\psi_n$ |
| $e_n$ | Maximum constraint processing energy of the task $\psi_n$ |
| $E_n^r$ | Residual energy of the user n |
| $B_n$ | Bandwidth allocated to the user n |
| $p_n^{d2d}$ | d2d transmission delay of the user n |
| $p_n^{d2e}$ | d2e transmission delay of the user n |
| $p_n^{idle}$ | Space energy of the user n |
| $h_{n,e}^{d2e}$ | Channel communication gain between the user n and a base station |
| $h_{n,m}^{d2d}$ | Channel communication gain between the user n and a user m |
| $N_0$ | System background interference noise |
| $\beta$ | Path loss factor |
| $d_{n,e}$ | Transmission distance between the user n and the base station |
| $d_{n,m}$ | Transmission distance between the user n and the user m |
| $\kappa$ | User battery energy coefficient |
| $f_n$ | cpu resources allocated by the users n to tasks |
| $f_{mec}^n$ | cpu resources allocated by the base station to the tasks |
| $f_{cloud}^n$ | cpu resources allocated by a cloud server to the tasks |
| $\Delta r^{e2c}$ | Transmission rate between the base station and the cloud server |

The realization, functional features and advantages of the present invention will be further explained with reference to the attached drawings in combination with the examples.

DETAILED DESCRIPTION OF EMBODIMENTS

With reference to the drawings in the embodiments of the present invention, the technical solutions in the embodiments of the present invention will be clearly and completely described. Obviously, the described embodiments are only part of the embodiments of the present invention, not all of the embodiments. On the basis of the embodiments in the present invention, all other embodiments obtained by a person of ordinary skill in the art without creative efforts shall fall within the protection scope of the present invention.

It should be noted that if there are directional indications (such as up, down, left, right, front, back, . . . ) in the embodiments of the present invention, the directional indications are only used to explain the relative positional relationship, movement situation, etc. among the components in a certain specific posture (as shown in the figures). If the specific posture changes, the directional indication also changes accordingly with same.

In addition, if there are descriptions of "first" and "second" in the embodiments of the present invention, the descriptions of "first" and "second" are merely for the purpose of description, and may not be construed as indicating or implying relative importance or implicitly specifying the number of technical features indicated. Thus, features defined by "first" and "second" may explicitly or implicitly comprise at least one of the features. In addition, the technical solutions of various embodiments may be combined with each other, but it must be based on the realization of ordinary technicians in the field. When the combination of technical solutions is contradictory or impossible, it should be considered that the combination of such technical solutions does not exist and is not within the scope of protection required by the present invention.

QoS (Quality of Service) refers to a network that may use various basic technologies to provide better service capabilities for designated network communication. It is a network security mechanism and a technology used to solve problems such as network delay and congestion. QoS guarantee is very important for networks with limited capacity, especially for streaming multimedia applications, such as a VoIP and an IPTV, because these applications often require a fixed transmission rate and are sensitive to delay.

The present invention proposes a method for differentially optimizing a quality of service (QoS). A method for differentially optimizing a quality of service (QoS) is used for computation-intensive applications represented by virtual reality and augmented reality, etc. The present invention takes a multi-user differentiated QoS optimization method on the basis of a multi-agent reinforcement learning as an example to explain the present invention.

Embodiment 1

Figure 2:
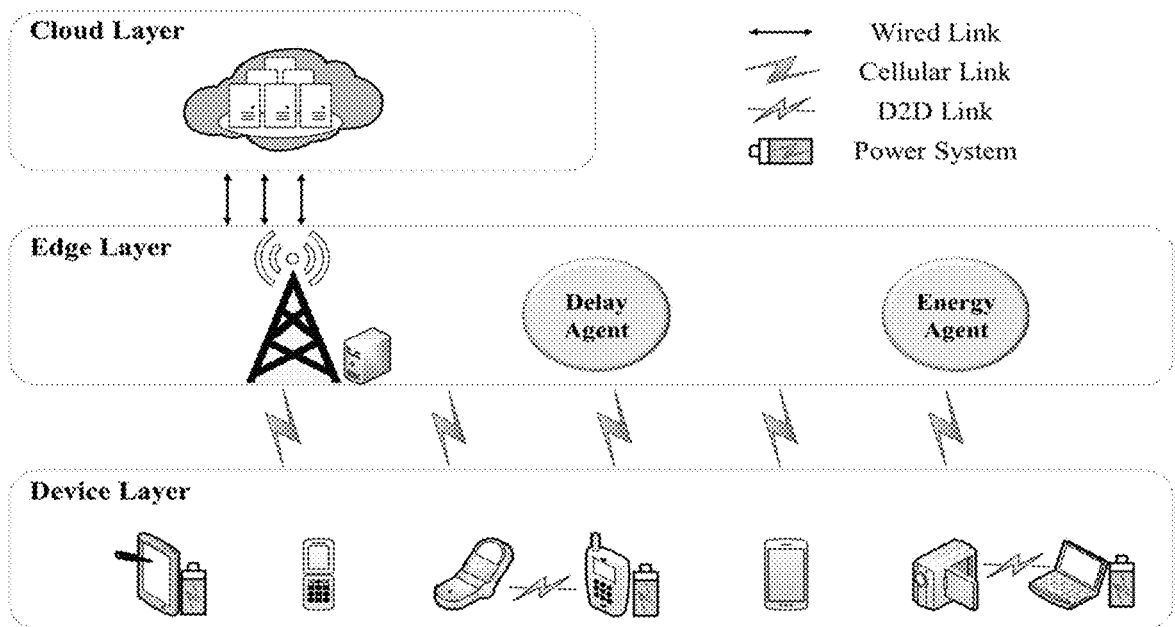
FIG. 2 is a structural schematic diagram of a system model of a multi-task unloading framework used in FIG. 1.
Figure 3:
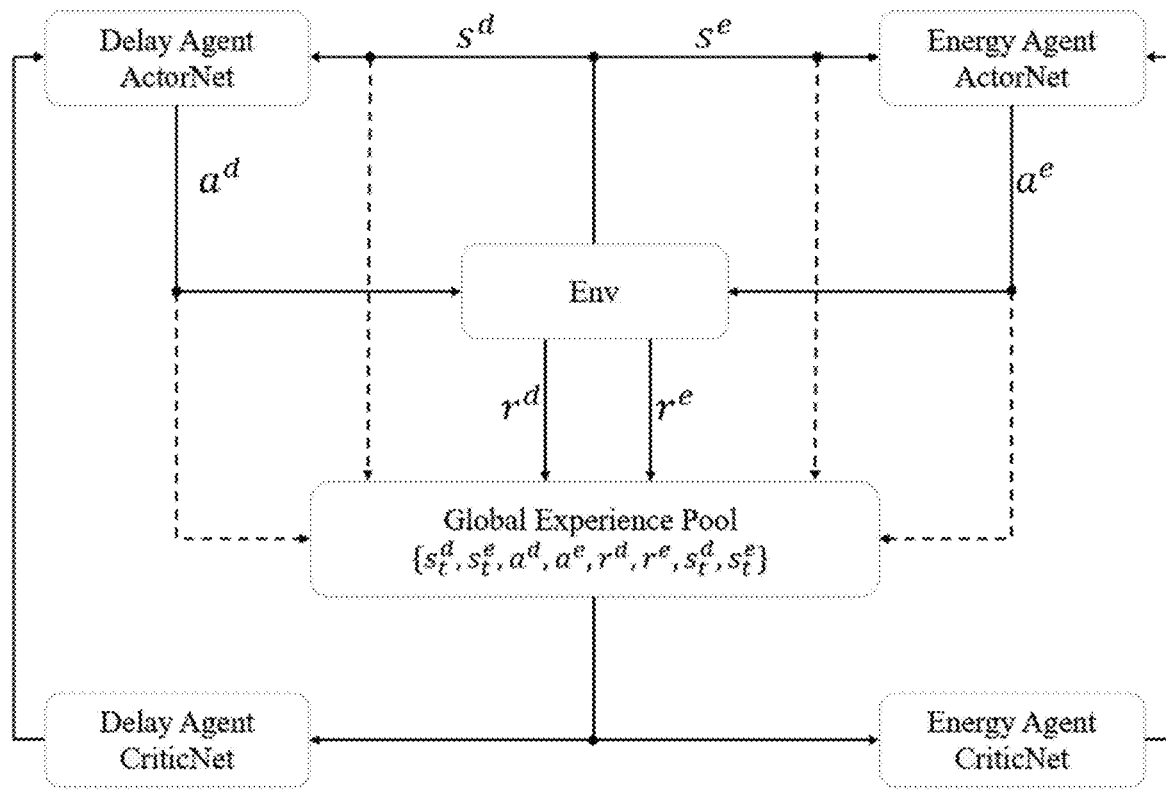
FIG. 3 is a structural schematic diagram of an algorithm model used in FIG. 1.

FIG. 1 is a method flow diagram of an embodiment of a method for differentially optimizing a quality of service (QoS) according to the present invention; FIG. 2 is a structural schematic diagram of a system model of a multi-task unloading framework used in FIG. 1; and FIG. 3 is a structural schematic diagram of an algorithm model used in FIG. 1. In an embodiment of the present invention, as shown in FIG. 1-FIG. 3, a method for differentially optimizing a quality of service (QoS) comprises the following steps:

S1, establishing a system model of a multi-task unloading framework.

In terms of model composition, a system model of a multi-task unloading framework comprises:

an MEC base station, a cloud server and a plurality of mobile users, wherein the plurality of mobile users are within a signal coverage range of the MEC base station. Preferably, an MEC base station is provided with an edge computation server and a decision agent. In the present embodiment, the decision agent comprises a delay agent and an energy agent. Wherein the delay agent is used for the decision of unloading for delay-sensitive tasks, and the energy agent is used for the decision of unloading for energy-sensitive tasks. In addition, the MEC base station communicates with a cloud service by means of a wired connection. Divide the whole network into discrete time slots with intervals of μ, and note as $\mathcal{T}=\{1, 2, \ldots, T\}$. Consider a quasi-static situation in which the position of a terminal and a system characteristic remain unchanged in a time slot.

Consider differentially optimizing QoS performance for users who do not need computation requirements. It is assumed that tasks generated by users with power supply system in time slot are delay-sensitive tasks, and tasks generated by users without power supply system are energy-sensitive tasks. For delay-sensitive tasks, by means of calculating the decision of unloading, the total delay of all delay-sensitive tasks in time slot is minimized, and the quality of service of users is improved. For energy-sensitive tasks, by means of calculating the decision of unloading, it is ensured that users may complete the calculation tasks within the remaining power, so as to prevent the situation that users run out of power and the tasks are still unfinished. Assuming that the MEC base station has a global view, it may acquire a user state and a system state in each time slot. The MEC base station may distribute all delay-sensitive tasks in time slot to delay agent for making a decision, and leave energy-sensitive tasks in time slot to energy agent for making a decision.

From the point of view of a model mode, the system model of the multi-task unloading framework comprises: a user model, a communication model and a computation model.

Using $\mathcal{N}=\{1, 2, \ldots, N\}$ to represent a set of mobile users. Each mobile terminal may communicate with the MEC base station by means of a cellular link, and users in a D2D communication range $\xi$ may communicate by means of a D2D communication link. Using $\mathcal{G}=\{1, 2, \ldots, G\}$ to represent a user set, which generates delay-sensitive tasks, using $\mathcal{H}=\{1, 2, \ldots, H\}$ to represent a user set, which generates energy-sensitive tasks, and G+H=N, using a quadruple $\psi_n = \{v_n, c_n, \tau_n, e_n\}$ to represent information of calculation tasks for a user n, wherein $v_n$, $c_n$ represents the size of a data volume of the computation task and CPU cycles required for computation unit bit data, and $\tau_n$, $e_n$ represents a constraint delay and a constraint energy of the calculation tasks. The energy of users without power supply system is constrained to a battery power value $E_n^r$ in the time slot, so as to ensure that the tasks may be completed before the power is run out.

The communication model: it is assumed that both the cellular network and the D2D link are based on a multi-user orthogonal frequency division multiple access (OFDMA) technology. Because each channel is orthogonally separated, the channels will not interfere with each other.

Define $B_n$, $n \in \mathcal{N}$ as a bandwidth allocated to the users by the system, and $h_{n,e}^{d2e}$ represents a channel power gain of the cellular link between the user n and the MEC base station. Allow $N_0$ to represent a transmission background noise power, $p_n^{d2e}$ to represent a D2E transmission power of the user n, $d_{n,e}$ represents the distance from the user n to an MEC server, and β is a path loss factor. A transmission rate at which the users transmit task data to an edge server may be represents as $$r_n^{d2e} = B_n \cdot \log_2\left(1 + \frac{p_n^{d2e} \cdot d_{n,e}^{-\beta} |h_{n,e}^{d2e}|^2}{N_0}\right)$$

Similarly, using $h_{n,m}^{d2d}$ to represent a channel power gain of the D2D link between the user n and a user m, $m \in \mathcal{N}$, using $d_{n,m}$ to represent the distance from the user n to a terminal m, and β is the path loss factor. Therefore, a transmission rate at which the users transmit the task data to neighboring users may be represented as $$r_{n,m}^{d2d} = B_n \cdot \log_2\left(1 + \frac{p_n^{d2d} \cdot d_{n,m}^{-\beta} |h_{n,m}^{d2d}|^2}{N_0}\right)$$

Considering that the MEC base station communicates with the cloud server by means of wired connection, and the bandwidth resources are sufficient, we use a constant $\Delta r^{e2c}$ to represent the transmission rate from the MEC base station to the cloud server.

S2, acquiring a mode for users executing a computation task, executing, according to the mode for users executing the computation task, the system model of the multi-task unloading framework.

Modes for users to execute the calculation task comprise: a local execution mode, a D2D execution mode, a D2E execution mode and a D2C execution mode.

A local execution mode, that is, the users use a local resource to process the computation task. When a user performs the computation task locally, a task completion delay and energy consumption of the users depend on the computation resources required for task processing and the locally available computation resources. The delay $D_n^{loc}$ and energy $E_n^{loc}$ of tasks n when calculate locally may be represents as $$D_n^{loc} = \frac{v_n \cdot c_n}{f_n};$$

$$E_n^{loc} = \kappa \cdot (f_n)^3 \cdot D_n^{loc},$$
$$= \kappa \cdot (f_n)^2 \cdot v_n \cdot c_n;$$

wherein, $v_n$, $c_n$ represents the size of a data volume of the computation task n and the number of CPU cycles required for computing data per unit bit, $f_n$ represents the computation resources allocated by the user n to the tasks, and κ is the number of effective capacitances of a device, which depends on a chip structure of the device.

A D2D execution mode, that is, the users unload task to a nearby terminal with abundant resource for execution by means of a D2D link. When the users unload the computation task to a nearby user m, m∈ $\mathcal{N}$ with abundant resources for execution by means of the D2D link, the completion delay $D_n^{loc}$ of the computation task is the sum of the transmission time of the task and the processing time of the task in the user m, that is:

$$D_n^{d2d} = D_{n,m}^{trans} + D_{n,m}^{comp}$$
$$= \frac{v_n}{r_{n,m}^{d2d}} + \frac{v_n \cdot c_n}{f_m^n};$$

when the users unload the tasks to other nodes for calculation, it is necessary to consider the energy consumed by users waiting for the results to be returned, therefore the energy consumed by the user n may be represents as:

$$E_n^{d2d} = p_n^{d2d} \cdot D_{n,m}^{trans} + p_n^{idle} \cdot D_{n,m}^{comp}$$
$$= p_n^{d2d} \cdot \frac{v_n}{r_{n,m}^{d2d}} + p_n^{idle} \cdot \frac{v_n \cdot c_n}{f_m^n};$$

wherein $r_{n,m}^{d2d}$ represents a D2D communication data rate, $f_m^n$ represents computation resources allocated by the service terminal m to the task n, and $p_n^{d2d}$, $p_n^{idle}$ represents the d2d transmission power of the user n and the waiting power in an idle state. According to the assumption of Chai et al., the D2D transmission power of the users is slightly less than the D2E transmission power, and choosing D2D unload may effectively reduce the energy of the users when conditions allow.

A D2E execution mode, that is, the users unload the task to an edge server by means of a cellular link for execution. When the users unload the computation task to the MEC base station for execution, the completion delay of the computation task is divided into two parts: the transmission delay of the data and the processing delay of the task in the MEC server. Then D2E delay is defined as:

$$D_n^{d2e} = D_{n,e}^{trans} + D_{n,e}^{comp}$$
$$= \frac{v_n}{r_{n,e}^{d2e}} + \frac{v_n \cdot c_n}{f_{mec}^n};$$

The energy consumed by the users may be represents as:

$$E_n^{d2e} = p_n^{d2e} \cdot D_{n,e}^{trans} + p_n^{idle} \cdot D_{n,e}^{comp}$$
$$= p_n^{d2e} \cdot \frac{v_n}{r_{n,e}^{d2d}} + p_n^{idle} \cdot \frac{v_n \cdot c_n}{f_{mec}^n};$$

wherein $r_{n,e}^{d2e}$ represents a D2E communication data rate, $f_{mec}^n$ represents computation resources allocated by an edge computation server to the task n, and $p_n^{d2e}$, $p_n^{idle}$ represents the d2e transmission power of the user n and the energy in an idle state.

A D2C execution mode, that is, the users transmit the task to the MEC base station by means of the cellular link, and then the MEC base station further sends the task to the cloud server for execution. When the users unload the computation task from the cloud server for execution, the completion time of the task includes three parts: the time when the task data is transmitted to the MEC base station, the time when the MEC base station transmits the task data to the cloud server and the time when the task is processed in the cloud server. Then D2C delay is defined as:

$$D_n^{d2c} = D_{n,e}^{trans} + D_{e,c}^{trans} + D_{n,c}^{comp}$$
$$= \frac{v_n}{r_{n,e}^{d2d}} + \frac{v_n}{\Delta r^{e2c}} + \frac{v_n \cdot c_n}{f_{cloud}^n};$$

similar to D2D unloading and D2E unloading, the user energy of the D2C unloading may be represented as:

$$E_n^{d2e} = p_n^{d2e} \cdot D_{n,e}^{trans} + p_n^{idle} \cdot \left(D_{e,c}^{trans} + D_{n,c}^{comp}\right)$$
$$= p_n^{d2e} \cdot \frac{v_n}{r_{n,e}^{d2d}} + p_n^{idle} \cdot \left(\frac{v_n}{\Delta r^{e2c}} + \frac{v_n \cdot c_n}{f_{cloud}^n}\right);$$

wherein, $f_{cloud}^n$ represents the computation resources allocated by the cloud server to the task n, $p_n^T$, $p_n^{idle}$ represents the transmission power of the user n and the energy in an idle state, and constant $\Delta r^{e2c}$ represents the transmission rate from the MEC base station to the cloud server.

According to the mode for users executing the computation task, the system model of the multi-task unloading framework comprises:

when a user i generates a computation task, selecting an optimal node to perform the computation task according to a requirement for a QoS of the users and the state of a network resource;

allowing a binary vector $a_i = \{a_{i,0}, \ldots, a_{i,N}^d, a_{i,N+1}^d\}$ to represent the decision of the computation task unloading, and allowing $a_{i,j} \in \{0,1\}$ to represent whether a node j executes the computation task generated by the user i;

when $a_{i,i}=1$, representing that a task i is executed locally, $a_{i,0}=1$ representing that the task i is unloaded to the MEC server for execution, and $a_{i,N+1}=1$ representing that the task i is unloaded to the cloud center for execution;

because the task is inseparable, there being a $\Sigma_{j=0}^{N+1} a_{i,j}=1$, a computation task completion delay generated by the user i is:

$$D_i = [a_{i,i}, \Sigma_{j \in N, j \neq i}^{N} a_{i,j}, a_{i,0}, a_{i,N+1}] \times [D_i^{loc}, D_i^{d2d}, D_i^{d2e}, D_i^{d2c}]^T;$$

and the energy consumption is:

$$E_i = [a_{i,i}, \Sigma_{j \in N, j \neq i}^{N} a_{i,j}, a_{i,0}, a_{i,N+1}] \times [E_i^{loc}, E_i^{d2d}, E_i^{d2e}, E_i^{d2c}]^T.$$

S3, optimizing a quality of service (QoS) on the basis of a multi-objective optimization method for a multi-agent deep reinforcement learning.

For simultaneous optimization on a plurality of optimization targets in the system, traditional single-agent deep reinforcement learning may only weight a plurality of optimization targets to construct a general optimization function, but the optimization effect is often determined by the weight. When the system state changes, the performance weight needs to be changed. This kind of method is cumbersome and inefficient. Therefore, the present invention proposes a MADDPG-based multi-agent computation unloading method, wherein each agent corresponds to an optimization target, and a plurality of targets in the system are differentially optimized, in order to improve a quality of service of the user.

MADDPG: multi-agent deep deterministic policy gradient, a DDPG-based multi-agent reinforcement learning framework for a deep deterministic policy gradient algorithm. MADDPG, a DDPG-based multi-agent deep reinforcement learning algorithm. MADDPG is an improvement of a DDPG algorithm to adapt to multi-Agent environment. The core part is that the critical part of each agent may acquire action information of all the remaining agents, and perform centralized training and decentralized execution, that is, when training, critical which may observe the whole situation is introduced to guide actor training, while when testing, only actors with local observations are used to take action. The model is composed of a plurality of DDPG networks, each of which learns policy π (Actor) and action value Q (Critic).

In specific implementation, optimizing a quality of service (QoS) on the basis of a multi-objective optimization method for a multi-agent deep reinforcement learning comprises:

setting a state space, an action space and a reward function;

performing QoS optimization, according to the state space, the action space and the reward function on the basis of multi-user differentiation for an MADDPG.

An MEC base station has a global view, and may acquire user information and a network resource condition in the system in each time slot. Considering the differentiated performance optimization of tasks with different QoS requirements, setting the state space comprises:

defining a delay agent and an energy agent, wherein the delay agent makes the decision of unloading for delay-sensitive tasks, and the energy agent makes the decision of unloading for energy-sensitive tasks; and using $s_t^d \in \mathcal{S}^d$, $s_t^e \in \mathcal{S}^e$ to represent the states of the delay agent and the energy agent in a time slot t, defined as follows $$s_t^d = \{d(t), u(t), v(t), c(t), \tau(t)\}.$$

$$s_t^e = \{d(t), u(t), v(t), c(t), e(t)\},$$

wherein $d(t) = \{d_1(t), \ldots, d_N(t)\}$, wherein $d_n(t) = \{d_{nj}(t): j \in 0 \cup \mathcal{N}\}$ represents the distance between the user n and the server and other users in the time slot t, wherein $d_{n,0}$ represents the distance between the user n and the edge computation server; $u(t) = \{u_0(t), \ldots, u_N(t), u_{N+1(t)}\}$ represents an available computation resource of the users and the server in the time slot t, $u_0(t)$ represents an available computation resource of the edge server, $u_{N+1}(t)$ represents an available computation resource of the cloud server, and $v(t) = \{v_1(t), \ldots, v_N(t)\}$ represents the size of a data volume of the computation task generated by the users in the time slot t, wherein $v_n(t)=0$ represents the user n does not generate the computation task in the time slot t, $c(t) = \{c_1(t), \ldots, c_N(t)\}$ represents the computation density size of the computation task generated by the user in the time slot t, that is, the number of CPU cycles required for computing data per bit, $\tau(t) = \{\tau_1(t), \ldots, \tau_N(t)\}$ represents the constraint delay of the computation task generated by the users in the time slot t, and $e(t) = \{e_1(t), \ldots, e_N(t)\}$ represents the user energy constraint of the computation task generated by the users in the time slot t.

Setting the action space comprises:

selecting, by the delay agent and the energy agent, an optimal task unloading node for the users according to the state $s_t^d$, $s_t^e$ of the time slot t, and using $a_t^d \in \mathcal{A}^d$, $a_t^e \in \mathcal{A}^e$ represent the decision of unloading for the delay agent and the energy agent in time slot t, represented as follows:

$$a_t^d = \{a_1(t), \ldots, a_G(t)\}, G \in \mathcal{G}$$

$$a_t^e = \{a_1(t), \ldots, a_H(t)\}, H \in \mathcal{H},$$

wherein $a_n(t) = [a_{n,0}(t), \ldots, a_{n,N}, a_{n,N+1}(t)]$ is a binary vector, which represents the unloading position of the computation task generated by the user n, and $\Sigma_{j=0}^{N+1} a_{n,j}(t)=1$, that is, the task is inseparable, and is unloaded to a selected node for execution.

When the user finishes the action, the user will get instant rewards from the environment. Consider the differentiated performance optimization for users with different QoS requirements, that is, perform delay optimization for delay-sensitive tasks and perform energy optimization for energy-sensitive tasks. Therefore, we define two corresponding reward settings respectively, and the reward functions comprise:

defining an instant time delay reward $r_t^d$ and an energy reward $r_t^e$, represented as follows:

$$r_t^d = \begin{cases} \sum_{g=1}^{G} (\tau_g(t) - D_g(t)), & \text{s.t. } C_1, C_3, C_4 \\ -\eta, & \text{otherwise} \end{cases};$$

$$r_t^e = \begin{cases} \sum_{h=1}^{H} (e_h(t) - E_h(t)), & \text{s.t. } C_2, C_3, C_4 \\ -\eta, & \text{otherwise} \end{cases};$$

wherein if the decision of unloading does not meet a constraint condition, the delay agent or the energy agent receives a penalty value, $-\eta$ represents that the action is unacceptable, wherein $\eta$ is a design parameter, and $\eta>0$.

By implementation of the present invention, an unloading policy is calculated on the basis of a multi-user differentiated QoS of a multi-agent deep reinforcement learning, and with the differentiated QoS requirements among different users in a system being considered, a global unloading decision is performed according to a task performance requirement and a network resource state, and differentiated performance optimization is performed on different user requirements, thereby effectively improving a system resource utilization rate and a user service quality.

Embodiment 2

Figure 4:
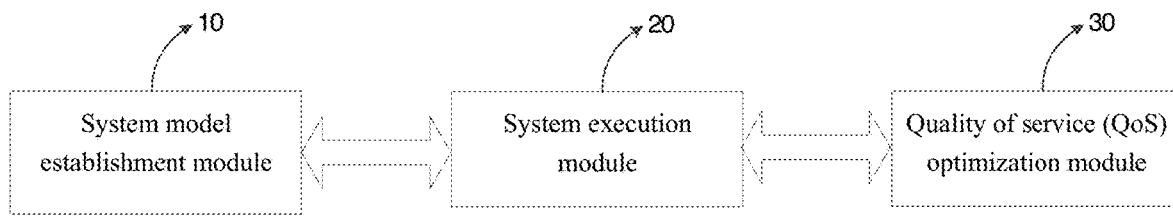
FIG. 4 is a structural schematic diagram of an embodiment of an apparatus for optimizing a quality of service (QoS) according to the present invention.

FIG. 4 is a structural schematic diagram of an embodiment of an apparatus for optimizing a quality of service (QoS) according to the present invention. As shown in FIG. 4, an apparatus for optimizing a quality of service (QoS), comprises:

a system model establishment module 10, used for establishing a system model of a multi-task unloading framework;

In terms of model composition, a system model of a multi-task unloading framework comprises:

an MEC base station, a cloud server and a plurality of mobile users, wherein the plurality of mobile users are within a signal coverage range of the MEC base station. Preferably, an MEC base station is provided with an edge computation server and a decision agent. In the present embodiment, the decision agent comprises a delay agent and an energy agent. Wherein the delay agent is used for the decision of unloading for delay-sensitive tasks, and the energy agent is used for the decision of unloading for energy-sensitive tasks. In addition, the MEC base station communicates with a cloud service by means of a wired connection. Divide the whole network into discrete time slots with intervals of μ, and note as $\mathcal{T} = \{1, 2, \ldots, T\}$. Consider a quasi-static situation in which the position of a terminal and a system characteristic remain unchanged in a time slot.

Consider differentially optimizing QoS performance for users who do not need computation requirements. It is assumed that tasks generated by users with power supply system in time slot are delay-sensitive tasks, and tasks generated by users without power supply system are energy-sensitive tasks. For delay-sensitive tasks, by means of calculating the decision of unloading, the total delay of all delay-sensitive tasks in time slot is minimized, and the quality of service of users is improved. For energy-sensitive tasks, by means of calculating the decision of unloading, it is ensured that users may complete the calculation tasks within the remaining power, so as to prevent the situation that users run out of power and the tasks are still unfinished. Assuming that the MEC base station has a global view, it may acquire a user state and a system state in each time slot. The MEC base station may distribute all delay-sensitive tasks in time slot to delay agent for making a decision, and leave energy-sensitive tasks in time slot to energy agent for making a decision.

From the point of view of a model mode, the system model of the multi-task unloading framework comprises: a user model, a communication model and a computation model.

Using $\mathcal{N} = \{1, 2, \ldots, N\}$ to represent a set of mobile users. Each mobile terminal may communicate with the MEC base station by means of a cellular link, and users in a D2D communication range ξ may communicate by means of a D2D communication link. Using $\mathcal{G} = \{1, 2, \ldots, G\}$ to represent a user set, which generates delay-sensitive tasks, using $\mathcal{H} = \{1, 2, \ldots, H\}$ to represent a user set, which generates energy-sensitive tasks, and G+H=N, using a quadruple $\psi_n = \{v_n, c_n, \tau_n, e_n\}$ to represent information of calculation tasks for a user n, wherein $v_n$, $c_n$ represents the size of a data volume of the computation task and CPU cycles required for computation unit bit data, and $\tau_n$, $e_n$ represents a constraint delay and a constraint energy of the calculation tasks. The energy of users without power supply system is constrained to a battery power value $E_n^r$ in the time slot, so as to ensure that the tasks may be completed before the power is run out.

The communication model: it is assumed that both the cellular network and the D2D link are based on a multi-user orthogonal frequency division multiple access (OFDMA) technology. Because each channel is orthogonally separated, the channels will not interfere with each other.

Define $B_n$, $n \in \mathcal{N}$ as a bandwidth allocated to the users by the system, and $h_{n,e}^{d2e}$ represents a channel power gain of the cellular link between the user n and the MEC base station. Allow $N_0$ to represent a transmission background noise power, $p_n^{d2e}$ to represent a D2E transmission power of the user n, $d_{n,e}$ represents the distance from the user n to an MEC server, and β is a path loss factor. A transmission rate at which the users transmit task data to an edge server may be represents as $$r_n^{d2e} = B_n \cdot \log_2\left(1 + \frac{p_n^{d2e} \cdot d_{n,e}^{-\beta} |h_{n,e}^{d2e}|^2}{N_0}\right);$$

Similarly, using $h_{n,m}^{d2d}$ to represent a channel power gain of the D2D link between the user n and a user m, $m \in \mathcal{N}$, using $d_{n,m}$ to represent the distance from the user n to a terminal m, and β is the path loss factor. Therefore, a transmission rate at which the users transmit the task data to neighboring users may be represented as $$r_{n,m}^{d2d} = B_n \cdot \log_2\left(1 + \frac{p_n^{d2d} \cdot d_{n,m}^{-\beta} |h_{n,m}^{d2d}|^2}{N_0}\right);$$

Considering that the MEC base station communicates with the cloud server by means of wired connection, and the bandwidth resources are sufficient, we use a constant $\Delta r^{e2c}$ to represent the transmission rate from the MEC base station to the cloud server.

A system execution module 20, used for acquiring a mode for users executing a computation task, executing, according to the mode for users executing the computation task, the system model of the multi-task unloading framework.

Modes for users to execute the calculation task comprise: a local execution mode, a D2D execution mode, a D2E execution mode and a D2C execution mode.

A local execution mode, that is, the users use a local resource to process the computation task. When a user performs the computation task locally, a task completion delay and energy consumption of the users depend on the computation resources required for task processing and the locally available computation resources. The delay $D_n^{loc}$ and energy $E_n^{loc}$ of tasks n when calculate locally may be represents as $$D_n^{loc} = \frac{v_n \cdot c_n}{f_{n'}};$$

$$E_n^{loc} = \kappa \cdot (f_n)^3 \cdot D_{n'}^{loc}$$
$$= \kappa \cdot (f_n)^2 \cdot v_n \cdot c_n$$

wherein, $v_n$, $c_n$ represents the size of a data volume of the computation task n and the number of CPU cycles required for computing data per unit bit, $f_n$ represents the computation resources allocated by the user n to the tasks, and κ is the number of effective capacitances of a device, which depends on a chip structure of the device.

A D2D execution mode, that is, the users unload task to a nearby terminal with abundant resource for execution by means of a D2D link. When the users unload the computation task to a nearby user m, m∈ $\mathcal{N}$ with abundant resources for execution by means of the D2D link, the completion delay $D_n^{loc}$ of the computation task is the sum of the transmission time of the task and the processing time of the task in the user m, that is:

$$D_n^{d2d} = D_{n,m}^{trans} + D_{n,m}^{comp}$$
$$= \frac{v_n}{r_{n,m}^{d2d}} + \frac{v_n \cdot c_n}{f_m^n} ;$$

when the users unload the tasks to other nodes for calculation, it is necessary to consider the energy consumed by users waiting for the results to be returned, therefore the energy consumed by the user n may be represents as:

$$E_n^{d2d} = p_n^{d2d} \cdot D_{n,m}^{trans} + p_n^{idle} \cdot D_{n,m}^{comp}$$
$$= p_n^{d2d} \cdot \frac{v_n}{r_{n,m}^{d2d}} + p_n^{idle} \cdot \frac{v_n \cdot c_n}{f_m^n} ;$$

wherein $r_{n,m}^{d2d}$ represents a D2D communication data rate, $f_m^n$ represents computation resources allocated by the service terminal m to the task n, and $p_n^{d2d}$, $p_n^{idle}$ represents the d2d transmission power of the user n and the waiting power in an idle state. According to the assumption of Chai et al., the D2D transmission power of the users is slightly less than the D2E transmission power, and choosing D2D unload may effectively reduce the energy of the users when conditions allow.

A D2E execution mode, that is, the users unload the task to an edge server by means of a cellular link for execution. When the users unload the computation task to the MEC base station for execution, the completion delay of the computation task is divided into two parts: the transmission delay of the data and the processing delay of the task in the MEC server. Then D2E delay is defined as:

$$D_n^{d2e} = D_{n,e}^{trans} + D_{n,e}^{comp}$$
$$= \frac{v_n}{r_{n,e}^{d2e}} + \frac{v_n \cdot c_n}{f_{mec}^n} ;$$

The energy consumed by the users may be represents as:

$$E_n^{d2e} = p_n^{d2e} \cdot D_{n,e}^{trans} + p_n^{idle} \cdot D_{n,e}^{comp}$$
$$= p_n^{d2e} \cdot \frac{v_n}{r_{n,e}^{d2d}} + p_n^{idle} \cdot \frac{v_n \cdot c_n}{f_{mec}^n} ;$$

wherein $r_{n,e}^{d2e}$ represents a D2E communication data rate, $f_{mec}^n$ represents computation resources allocated by an edge computation server to the task n, and $p_n^{d2e}$, $p_n^{idle}$ represents the d2e transmission power of the user n and the energy in an idle state.

a D2C execution mode, that is, the users transmit the task to the MEC base station by means of the cellular link, and then the MEC base station further sends the task to the cloud server for execution. When the users unload the computation task from the cloud server for execution, the completion time of the task includes three parts: the time when the task data is transmitted to the MEC base station, the time when the MEC base station transmits the task data to the cloud server and the time when the task is processed in the cloud server. Then D2C delay is defined as:

$$D_n^{d2c} = D_{n,e}^{trans} + D_{e,c}^{trans} + D_{n,c}^{comp}$$
$$= \frac{v_n}{r_{n,e}^{d2e}} + \frac{v_n}{\Delta r^{e2c}} + \frac{v_n \cdot c_n}{f_{cloud}^n} ;$$

similar to D2D unloading and D2E unloading, the user energy of the D2C unloading may be represented as:

$$E_n^{d2c} = p_n^{d2e} \cdot D_{n,e}^{trans} + p_n^{idle} \cdot (D_{e,c}^{trans} + D_{n,c}^{comp})$$
$$= p_n^{d2e} \cdot \frac{v_n}{r_{n,e}^{d2d}} + p_n^{idle} \cdot \left(\frac{v_n}{\Delta r^{e2c}} + \frac{v_n \cdot c_n}{f_{cloud}^n}\right) ;$$

wherein, $f_{cloud}^n$ represents the computation resources allocated by the cloud server to the task n, $p_n^T$, $p_n^{idle}$ represents the transmission power of the user n and the energy in an idle state, and constant $\Delta r^{e2c}$ represents the transmission rate from the MEC base station to the cloud server.

According to the mode for users executing the computation task, the system model of the multi-task unloading framework comprises:

when a user i generates a computation task, selecting an optimal node to perform the computation task according to a requirement for a QoS of the users and the state of a network resource;

allowing a binary vector $a_i = \{a_{i,0}, \ldots, a_{i,N}^d, a_{i,N+1}^d\}$ to represent the decision of the computation task unloading, and allowing $a_{i,j} \in \{0,1\}$ to represent whether a node j executes the computation task generated by the user i;

when $a_{i,i} = 1$, representing that a task i is executed locally, $a_{i,0} = 1$ representing that the task i is unloaded to the MEC server for execution, and $a_{i,N+1} = 1$ representing that the task i is unloaded to the cloud center for execution;

because the task is inseparable, there being a $\Sigma_{j=0}^{N+1} a_{i,j} = 1$, a computation task completion delay generated by the user i is:

$$D_i = [a_{i,i}, \Sigma_{j\in \mathcal{N}, j\neq i}^N a_{i,j}, a_{i,0} a_{i,N+1}] \times [D_i^{loc}, D_i^{d2d}, D_i^{d2e}, D_i^{d2c}]^T;$$

and the energy consumption is:

$$E_i = [a_{i,i}, \Sigma_{j\in \mathcal{N}, j\neq i}^N a_{i,j}, a_{i,0} a_{i,N+1}] \times [E_i^{loc}, E_i^{d2d}, E_i^{d2e}, E_i^{d2c}]^T.$$

A quality of service (QoS) optimization module 30, used for optimizing a quality of service (QoS) on the basis of a multi-objective optimization method for a multi-agent deep reinforcement learning.

For simultaneous optimization on a plurality of optimization targets in the system, traditional single-agent deep reinforcement learning may only weight a plurality of optimization targets to construct a general optimization function, but the optimization effect is often determined by the weight. When the system state changes, the performance weight needs to be changed. This kind of method is cumbersome and inefficient. Therefore, the present invention proposes a MADDPG-based multi-agent computation unloading method, wherein each agent corresponds to an optimization target, and a plurality of targets in the system are differentially optimized, in order to improve a quality of service of the user.

MADDPG: multi-agent deep deterministic policy gradient, a DDPG-based multi-agent reinforcement learning framework for a deep deterministic policy gradient algorithm. MADDPG, a DDPG-based multi-agent deep reinforcement learning algorithm. MADDPG is an improvement of a DDPG algorithm to adapt to multi-Agent environment. The core part is that the critical part of each agent may acquire action information of all the remaining agents, and perform centralized training and decentralized execution, that is, when training, critical which may observe the whole situation is introduced to guide actor training, while when testing, only actors with local observations are used to take action. The model is composed of a plurality of DDPG networks, each of which learns policy π (Actor) and action value Q (Critic).

In specific implementation, optimizing a quality of service (QoS) on the basis of a multi-objective optimization method for a multi-agent deep reinforcement learning comprises:
  setting a state space, an action space and a reward function;
  performing QoS optimization, according to the state space, the action space and the reward function on the basis of multi-user differentiation for an MADDPG.

An MEC base station has a global view, and may acquire user information and a network resource condition in the system in each time slot. Considering the differentiated performance optimization of tasks with different QoS requirements, setting the state space comprises:
  defining a delay agent and an energy agent, wherein the delay agent makes the decision of unloading for delay-sensitive tasks, and the energy agent makes the decision of unloading for energy-sensitive tasks; and
  using $s_t^d \in \mathcal{S}^d$, $s_t^e \in \mathcal{S}^e$ to represent the states of the delay agent and the energy agent in a time slot t, defined as follows $$s_t^d = \{d(t), u(t), v(t), c(t), \tau(t)\}.$$

$$s_t^e = \{d(t), u(t), v(t), c(t), e(t)\},$$

wherein $d(t) = \{d_1(t), \ldots, d_N(t)\}$, wherein $d_n(t) = \{d_{nj}(t): j \in 0 \cup \mathcal{N}\}$ represents the distance between the user n and the server and other users in the time slot t, wherein $d_{n,0}$ represents the distance between the user n and the edge computation server; $u(t) = \{u_0(t), \ldots, u_N(t), u_{N+1(t)}\}$ represents an available computation resource of the users and the server in the time slot t, $u_0(t)$ represents an available computation resource of the edge server, $u_{N+1}(t)$ represents an available computation resource of the cloud server, and $v(t) = \{v_1(t), \ldots, v_N(t)\}$ represents the size of a data volume of the computation task generated by the users in the time slot t, wherein $v_n(t) = 0$ represents the user n does not generate the computation task in the time slot t, $c(t) = \{c_1(t), \ldots, c_N(t)\}$ represents the computation density size of the computation task generated by the user in the time slot t, that is, the number of CPU cycles required for computing data per bit, $\tau(t) = \{\tau_1(t), \ldots, \tau_N(t)\}$ represents the constraint delay of the computation task generated by the users in the time slot t, and $e(t) = \{e_1(t), \ldots, e_N(t)\}$ represents the user energy constraint of the computation task generated by the users in the time slot t.

Setting the action space comprises:
  selecting, by the delay agent and the energy agent, an optimal task unloading node for the users according to the state $s_t^d$, $s_t^e$ of the time slot t, and using $a_t^d \in \mathcal{A}^d$, $a_t^e \in \mathcal{A}^e$ represent the decision of unloading for the delay agent and the energy agent in time slot t, represented as follows:

$$a_t^d = \{a_1(t), \ldots, a_G(t)\}, G \in \mathcal{H}$$

$$a_t^e = \{a_1(t), \ldots, a_H(t)\}, H \in \mathcal{H},$$

wherein $a_n(t) = [a_{n,0}(t), \ldots, a_{n,N}, a_{n,N+1}(t)]$ is a binary vector, which represents the unloading position of the computation task generated by the user n, and $\Sigma_{j=0}^{N+1} a_{n,j}(t) = 1$, that is, the task is inseparable, and is unloaded to a selected node for execution.

When the user finishes the action, the user will get instant rewards from the environment. Consider the differentiated performance optimization for users with different QoS requirements, that is, perform delay optimization for delay-sensitive tasks and perform energy optimization for energy-sensitive tasks. Therefore, we define two corresponding reward settings respectively, and the reward functions comprise:
  defining an instant time delay reward $r_t^d$ and an energy reward $r_t^e$, represented as follows:

$$r_t^d = \begin{cases} \sum_{g=1}^{G} (\tau_g(t) - D_g(t)), & \text{s.t. } C_1, C_3, C_4 \\ -\eta, & \text{otherwise} \end{cases};$$

$$r_t^e = \begin{cases} \sum_{h=1}^{H} (e_h(t) - E_h(t)), & \text{s.t. } C_2, C_3, C_4 \\ -\eta, & \text{otherwise} \end{cases};$$

wherein if the decision of unloading does not meet a constraint condition, the delay agent or the energy agent receives a penalty value, $-\eta$ represents that the action is unacceptable, wherein $\eta$ is a design parameter, and $\eta > 0$.

By implementation of the present invention, an unloading policy is calculated on the basis of a multi-user differentiated QoS of a multi-agent deep reinforcement learning, and with the differentiated QoS requirements among different users in a system being considered, a global unloading decision is performed according to a task performance requirement and a network resource state, and differentiated performance optimization is performed on different user requirements, thereby effectively improving a system resource utilization rate and a user service quality.

What has been described above is only the preferred embodiment of the present invention, and it does not limit the patent scope of the present invention. Equivalent structural changes made by using the contents of the description and drawings of the present invention or directly/indirectly applied in other related technical fields under the inventive concept of the present invention are comprised in the patent protection scope of the present invention.

What is claimed:

1. A method for differentially optimizing a quality of service (QoS), characterized in that the method comprises:
  establishing a system model of a multi-task unloading framework;
  acquiring a mode for users executing a computation task, executing, according to the mode for users executing the computation task, the system model of the multi-task unloading framework; and
  optimizing a quality of service (QoS) on the basis of a multi-objective optimization method for a multi-agent deep reinforcement learning,
  wherein the system model for executing the multi-task unloading framework according to the mode of the users executing computation task comprises:
  when a user i generates a computation task, selecting an optimal node to perform the computation task according to a requirement for a QoS of the users and the state of a network resource;
  allowing a binary vector $a_i = \{a_{i,0}, \ldots, a_{i,N}^d, a_{i,N+1}^d\}$ to represent the decision of the computation task unloading, and allowing $a_{i,j} \in \{0,1\}$ to represent whether a node j executes the computation task generated by the user i;

when $a_{i,i}=1$, representing that a task i is executed locally, $a_{i,o}=1$ representing that the task i is unloaded to the MEC server for execution, and $a_{i,N}=1$ representing that the task i is unloaded to the cloud center for execution; because the task is inseparable, there being a $\Sigma_{j=0}^{N+1} a_{i,j}=1$, a computation task completion delay generated by the user i is:

$$D_i = \left[ a_{i,i}, \sum_{j \in N, j \neq i}^{N} a_{i,j}, a_{i,0}, a_{i,N+1} \right] \times [D_i^{loc}, D_i^{d2d}, D_i^{d2e}, D_i^{d2c}]^T;$$

and
the energy consumption is:

$$E_i = \left[ a_{i,i}, \sum_{j \in N, j \neq i}^{N} a_{i,j}, a_{i,0}, a_{i,N+1} \right] \times [E_i^{loc}, E_i^{d2d}, E_i^{d2e}, E_i^{d2c}]^T.$$

2. The method for differentially optimizing a quality of service (QoS) according to claim 1, characterized in that the system model of the multi-task unloading framework comprises:
a Multi-access edge computing (MEC) base station, a cloud server and a plurality of mobile users, wherein the plurality of mobile users are within a signal coverage range of the MEC base station.

3. The method for differentially optimizing a quality of service (QoS) according to claim 2, characterized in that the MEC base station is provided with an edge computation server and a decision agent.

4. The method for differentially optimizing a quality of service (QoS) according to claim 3, characterized in that the mode for users executing the computation task comprises:
a local execution mode, that is, the users use a local resource to process the computation task;
a D2D execution mode, that is, the users unload task to a nearby terminal with abundant resource for execution by means of a D2D link;
a D2E execution mode, that is, the users unload the task to an edge server by means of a cellular link for execution; and
a D2C execution mode, that is, the users transmit the task to the MEC base station by means of the cellular link, and then the MEC base station further sends the task to the cloud server for execution.

5. The method for differentially optimizing a quality of service (QoS) according to claim 1, characterized in that the system model of the multi-task unloading framework comprises:
a user model, a communication model and a computation model.

6. The method for differentially optimizing a quality of service (QoS) according to claim 1, characterized in that optimizing a quality of service (QoS) on the basis of a multi-objective optimization method for a multi-agent deep reinforcement learning comprises:
setting a state space, an action space and a reward function;
performing QoS optimization, according to the state space, the action space and the reward function on the basis of multi-user differentiation for a Multi-Agent Deep Deterministic Policy Gradient (MADDPG) algorithm.

7. The method for differentially optimizing a quality of service (QoS) according to claim 6, characterized in that setting the state space comprises:
defining a delay agent and an energy agent, wherein the delay agent makes the decision of unloading for delay-sensitive tasks, and the energy agent makes the decision of unloading for energy-sensitive tasks; and
using $s_t^d \in \mathcal{S}^d$, $s_t^e \in \mathcal{S}^e$ to represent the states of the delay agent and the energy agent in a time slot t, defined as follows $$s_t^d = \{d(t), u(t), v(t), c(t), \tau(t)\}.$$

$$s_t^e = \{d(t), u(t), v(t), c(t), e(t)\},$$

wherein $d(t) = \{d_1(t), \ldots, d_N(t)\}$, wherein $d_n(t) = \{d_{nj}(t): j \in 0 \cup \mathcal{N}\}$ represents the distance between the user n and the server and other users in the time slot t, wherein $d_{n,o}$ represents the distance between the user n and the edge computation server; $u(t) = \{u_0(t), \ldots, u_N(t), u_{N+1(t)}\}$ represents an available computation resource of the users and the server in the time slot t, $u_o(t)$ represents an available computation resource of the edge server, $u_{n+1}(t)$ represents an available computation resource of the cloud server, and $v(t) = \{v_1(t), \ldots, v_N(t)\}$ represents the size of a data volume of the computation task generated by the users in the time slot t, wherein vn(t)=0 represents the user n does not generate the computation task in the time slot t, $c(t) = \{c_1(t), \ldots, c_N(t)\}$ represents the computation density size of the computation task generated by the user in the time slot t, that is, the number of CPU cycles required for computing data per bit, $\tau(t) = \{\tau_1(t), \ldots, \tau_N(t)\}$ represents the constraint delay of the computation task generated by the users in the time slot t, and $e(t) = \{e_1(t), \ldots, e_N(t)\}$ represents the user energy constraint of the computation task generated by the users in the time slot t.

8. The method for differentially optimizing a quality of service (QoS) according to claim 7, characterized in that setting the action space comprises:
selecting, by the delay agent and the energy agent, an optimal task unloading node for the users according to the state $s_t^d$, $s_t^e$ of the time slot t, and using $a_t^d \in \mathcal{A}^d$, $a_t^e \in \mathcal{A}^e$ represent the decision of unloading for the delay agent and the energy agent in time slot t, represented as follows:

$$a_t^d = \{a_1(t), \ldots, a_G(t)\}, G \in \mathcal{G}.$$

$$a_t^e = \{a_1(t), \ldots, a_H(t)\}, H \in \mathcal{H},$$

wherein $a_n(t) = [a_{n,0}(t), \ldots, a_{n,N}, a_{n,N+1}(t)]$ is a binary vector, which represents the unloading position of the computation task generated by the user n, and $\Sigma_{j=0}^{N+1} a_{n,j}(t)=1$, that is, the task is inseparable, and is unloaded to a selected node for execution.

9. The method for differentially optimizing a quality of service (QoS) according to claim 7, characterized in that setting the reward function comprises:
defining an instant time delay reward $r_t^d$ and an energy reward $r_t^e$, represented as follows:

$$r_t^d = \begin{cases} \sum_{g=1}^{G} (\tau_g(t) - D_g(t)), & \text{s.t. } C_1, C_3, C_4 \\ -\eta, & \text{otherwise} \end{cases};$$

$$r_t^e = \begin{cases} \sum_{h=1}^{H} (e_h(t) - E_h(t)), & \text{s.t. } C_2, C_3, C_4 \\ -\eta, & \text{otherwise} \end{cases};$$

wherein if the decision of unloading does not meet a constraint condition, the delay agent or the energy agent receives a penalty value, $-\eta$ represents that the action is unacceptable, wherein $\eta$ is a design parameter, and $\eta > 0$.

10. An apparatus for optimizing a quality of service (QoS), characterized in that the apparatus comprises:
a system model establishment module, used for establishing a system model of a multi-task unloading framework;
a system execution module, used for acquiring a mode for users executing a computation task, executing, according to the mode for users executing the computation task, the system model of the multi-task unloading framework; and
a quality of service (QoS) optimization module, used for optimizing a quality of service (QoS) on the basis of a multi-objective optimization method for a multi-agent deep reinforcement learning, wherein the system model for executing the multi-task unloading framework according to the mode of the users executing computation task comprises:
when a user i generates a computation task, selecting an optimal node to perform the computation task according to a requirement for a QoS of the users and the state of a network resource;
allowing a binary vector $a_i = \{a_{i,0}, \ldots, a_{i,N}^d, a_{i,N+1}^d\}$ to represent the decision of the computation task unloading, and allowing $a_{i,j} \in \{0,1\}$ to represent whether a node j executes the computation task generated by the user i;
when $a_{i,i} = 1$, representing that a task i is executed locally, $a_{i,0} = 1$ representing that the task i is unloaded to the MEC server for execution, and $a_{i,N+1} = 1$ representing that the task i is unloaded to the cloud center for execution;
because the task is inseparable, there being a $\Sigma_{j=0}^{N+1} a_{i,j} = 1$, a computation task completion delay generated by the user i is:

$$D_i = [a_{i,i}, \Sigma_{j \in \mathcal{N}, j \neq i}^{N} a_{i,j}, a_{i,0}, a_{i,N+1}] \times [D_i^{loc}, D_i^{d2d}, D_i^{d2e}, D_i^{d2c}]^T;$$

the energy consumption is:

$$E_i = [a_{i,i}, \Sigma_{j \in \mathcal{N}, j \neq i}^{N} a_{i,j}, a_{i,0}, a_{i,N+1}] \times [E_i^{loc}, E_i^{d2d}, E_i^{d2e}, E_i^{d2c}]^T.$$

\* \* \* \* \*